Dec. 12, 1939.   R. G. DREW   2,183,330
PROCESS OF PACKAGING AND RESULTING ARTICLE
Filed June 10, 1933   3 Sheets-Sheet 1
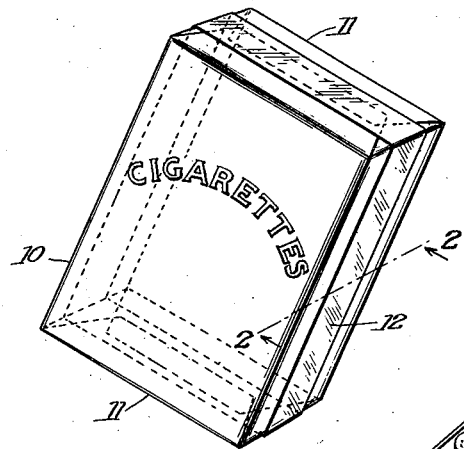
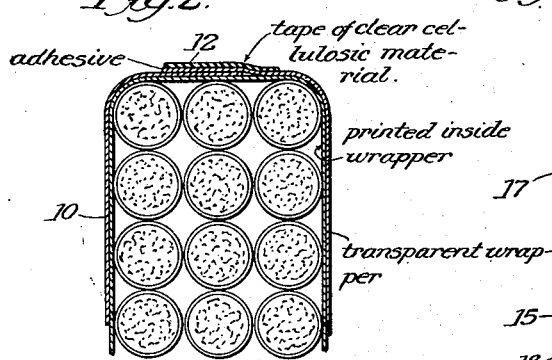
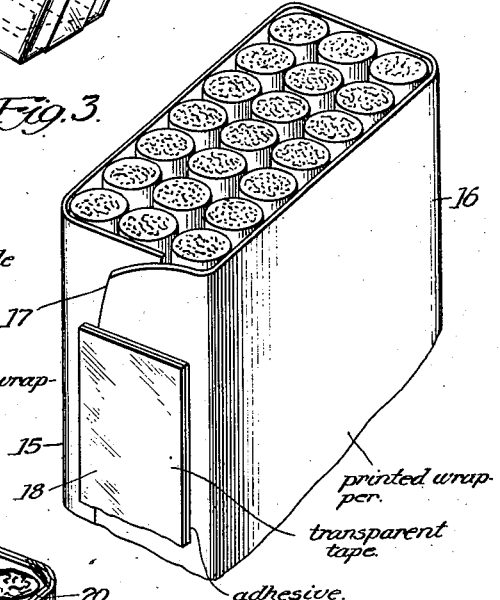
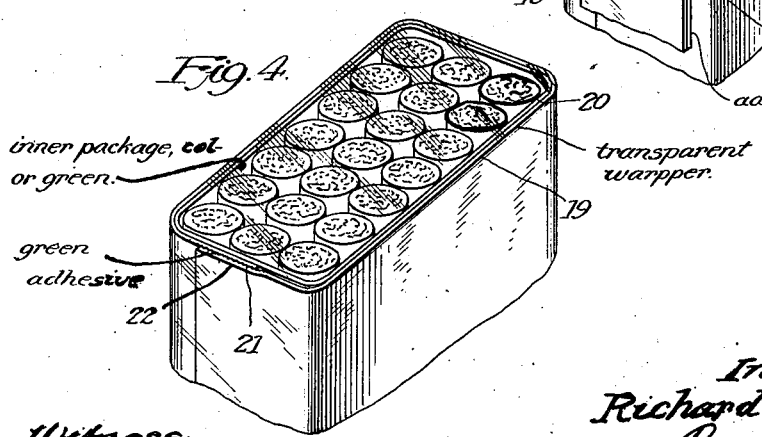
Inventor:
Richard Gurley Drew Dec. 12, 1939.   R. G. DREW   2,183,330
PROCESS OF PACKAGING AND RESULTING ARTICLE
Filed June 10, 1933   3 Sheets-Sheet 2
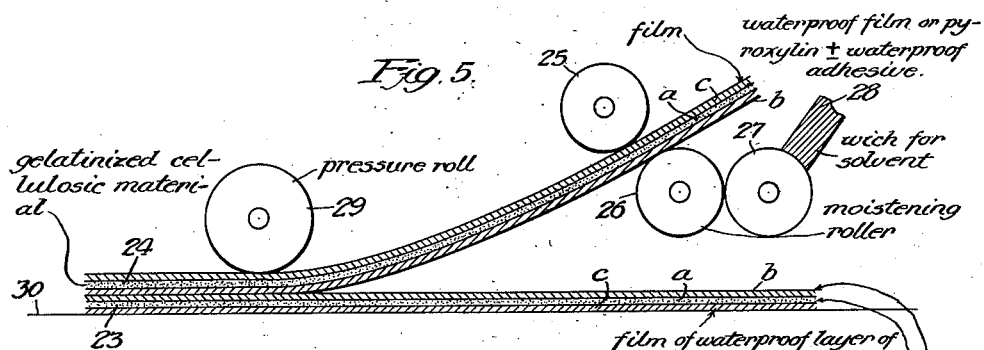
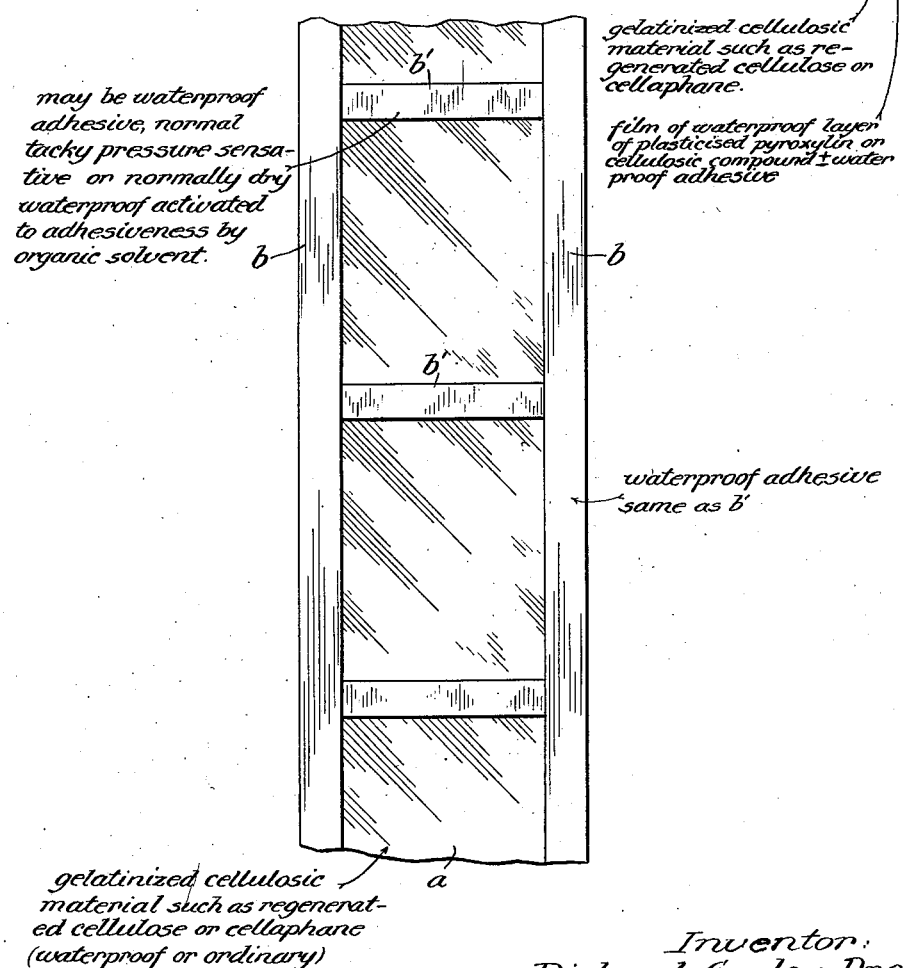
Inventor:
Richard Gurley Drew Dec. 12, 1939.   R. G. DREW   2,183,330
PROCESS OF PACKAGING AND RESULTING ARTICLE
Filed June 10, 1933   3 Sheets-Sheet 3
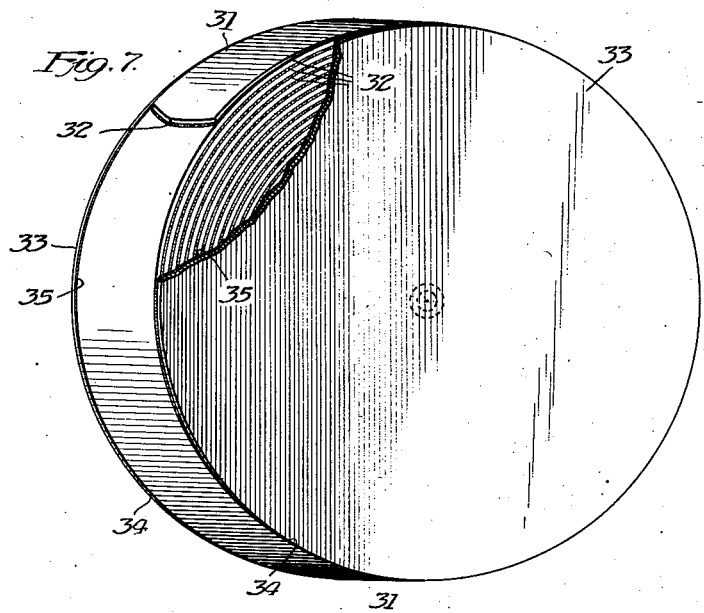
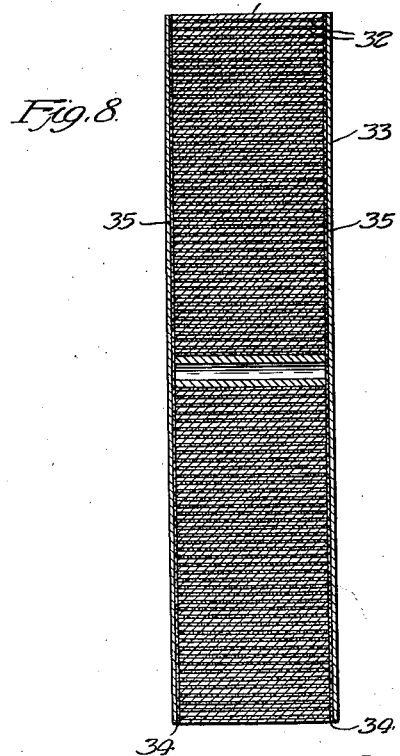
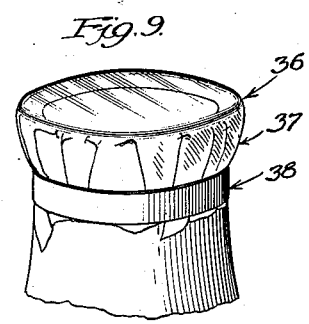
Inventor
Richard Gurley Drew
By Paul Carpenter
Atty.
Witness
R B Davison Patented Dec. 12, 1939

2,183,330

UNITED STATES PATENT OFFICE 2,183,330

PROCESS OF PACKAGING AND RESULTING ARTICLE

Richard Gurley Drew, St. Paul, Minn., assignor to Minnesota Mining & Manufacturing Company, St. Paul, Minn., a corporation of Delaware Application June 10, 1933, Serial No. 675,289

13 Claims. (Cl. 93—2)

This invention relates to tapes; more particularly, to transparent tapes, carrying an adhesive; and to methods of making such article, the adhesive compositions carried thereby and to new and useful methods of applying this article.

Recent developments have found it desirable to use as a packaging and merchandising material, thin and transparent sheeted material for its natural display qualities, and serving in the nature of a waterproofing fabric or covering for a layer of printing matter or for the merchandise itself. This packaging material comprises gelatinized cellulosic materials, which result in transparent films, such as regenerated cellulose, cellulose esters, such as cellulose nitrate, cellulose acetate or cellulose ethers, such as ethyl cellulose, or sheets comprising composites of such gelatinized cellulosic materials, such as a layer or film of regenerated cellulose combined with a layer or film of cellulosic compounds. The popularity of these materials resides in such qualities as brilliancy, sheen and transparency, and in later development of such material, in the waterproofness of this type of packaging material.

In using such transparent films, particularly as result from sheeted regenerated cellulose, the highly glazed surface and character of this sheet have made present types of adhesives unsuitable for adhesively applying this type of sheet or film in position, or for sealing a package made thereof into firm and waterproof contact. Thus where present day adhesives may be useful with paper for sealing a fibrous type of sheeted material, with highly polished transparent sheets these adhesives are ineffective as a seal, are non-adherent as well as objectionable in that they modify the transparent characteristic of the packaging material, film or sheet and detract from its desirable appearance.

In using gelatinized cellulosic sheets for packaging purposes in which the waterproof characteristics of the film are found desirable, present adhesives are further objectionable, in that they are non-adherent to this type of film and thereby the hermetic sealing characteristic of this sheeting are ineffective. Furthermore, in using gelatinized cellulosic sheeting material, such as known on the market as ordinary "Cellophane," the hygroscopic characteristics of this sheeting material have made it objectionable as well as highly undesirable to use a glue bond adhesive in that a coating of such adhesive, as well as the moistening operation necessary for applying the same, will unduly warp and curl the transparent sheeting material and deface the package upon which it is used.

It is therefore an object of my invention to provide a sheeted fabric of such material, such as gelatinized cellulosic material, and provide the same with an adhesive therefor, or a coating thereon which in no way interferes with the desirable properties of this transparent film while augmenting the characteristics of waterproofness, where this quality is desirable.

It is contemplated by my invention to provide a transparent film made of gelatinized cellulosic materials, and unified with an adhesive coating which will in no way interfere with the desirable transparent characteristics of this material. It is further contemplated by my invention to provide sheets of transparent gelatinized cellulosic material with an adhesive coating, which will not alter the transparent characteristics of the film by reason of its presence or by reason of the method of application, in the position desired.

It is a further object of my invention to provide tape made of transparent sheeting which constitutes gelatinized cellulosic materials with a unified adherent coating of adhesive material, permitting the composite to be stacked or formed into rolls and applied to use without disfiguring or altering the transparent characteristics of the film in that the adhesive is directly pressure sensitive or that the energizing of the adhesive does not in any way alter the characteristics of the transparent film. Thus, it is contemplated by my invention to provide transparent sheeting material, such as that made of gelatinized cellulosic material, with a water insoluble adhesive coating which, in itself, is transparent and which permits application of this film wherever desired, without alteration of the transparent film.

It is a further object of my invention to provide an adhesive tape which has utility for sealing, and will not detract from the display of the wrapper or container, characteristic of using a transparent sheeted material carrying an adhesive coat. It is contemplated by me to provide a transparent web or sheet, with a united adhesive coat, the composite of the adhesive and sheet being substantially transparent and the adhesion of the adhesive coat to the web having all the tenacious qualities characteristic of applying the adhesive layer to a fibrous type of sheeted material.

It is further contemplated by my invention to provide a method for preparing an adhesive tape or webbing, in sheet form, which has all the transparency, flexibility and waterproofing characteristics of gelatinized cellulosic materials, and the strength of unification between the cellulosic sheeted material and the adhesive coating to permit the product to be stacked or formed into rolls, when the adhesive coating is normally tacky and pressure sensitive, or when the adhesive coating is one which is normally dry and may be energized to adhesiveness, such change may be accomplished without in any way detracting from the transparent characteristics of the backing material.

Further objects of my invention reside in the preparation of an adhesive composition which may be applied to backing material, and particularly useful in connection with backing materials comprising smooth, highly polished and transparent sheeted material, such as made from gelatinized cellulosic material which, when so applied, will not interfere with the transparent characteristic of this backing material, and will firmly adhere thereto and act as an efficient bond and seal therefor.

In general, it is an object of my invention to provide an adhesive tape comprising a backing of clearly transparent material and carrying an adhesive coat, the adhesive being of the character to be transparent and in equilibrium with the transparent backing material to in no way interfere with the desirable characteristics of the composite due to disfigurement by warping, or due to coloration, opacity, resulting from applying the adhesive coating to the backing material.

In preparing an article of the character contemplated by me, comprising a transparent backing material, carrying an adhesive coat, it is preferred that the backing material comprise gelatinized cellulosic materials which result in transparent films, such as regenerated cellulose, cellulose esters, cellulose ethers, such as cellulose nitrate, cellulose acetate or ethyl cellulose, or composites of such gelatinized cellulosic materials, such as a layer of regenerated cellulose combined with a layer or layers of cellulosic compounds. I may further utilize a backing material comprising transparent sheets made from materials other than cellulosic material, and which may include a film of waterproofing material, such as films made of cellulosic compounds, varnishes, lacquers or the like.

In its preferred form, my invention is particularly applicable to transparent films of gelatinized cellulosic materials, such as regenerated cellulose, which is clear, transparent or lustrous, and softened with glycerine.

The product so made, though desirable for a great many purposes, has a tendency to be hygroscopic. It is preferred, therefore, to waterproof the film so produced, either on one side or on both sides, with a thin film of nitro-cellulose, cellulose acetate, cellulose ether, and similar cellulosic compounds. It will be understood that the waterproofing ingredients may include oxidized oils, varnishes and lacquers. The primary requisite is the application of these waterproofing films so as not to impair the lustrous and transparent characteristics of the sheet formed and to overcome any tendency to provide a warped sheet by the waterproofing layer that may be applied.

Additionally, coatings such as transparent rubber, synthetic resins, and like materials may be used as a waterproof coating.

In the use of the film as thus provided as a backing material for adhesive tape or for purposes of adhering adhesive tapes thereto, glue type adhesive tapes are insufficiently adherent by reason of the highly glazed surface provided by this type of backing material. The use of ordinary adhesive tapes detracts from the package formed, where the transparent film is used as the packaging material.

I have found that I may utilize the transparent films of the character above described, having a highly polished, lustrous surface, and form a seal therefor or an adhesive tape therefrom by applying thereto an adhesive layer which becomes unified thereto and is in elastic equilibrium with the backing materials so that it has the full adhesive qualities and does not interfere with or disfigure the transparent or lustrous qualities of the backing material or the sheet to which it is applied by reason of any tendency to warp or curl the same, or where utilized with a backing material of the character described and referred to as gelatinized cellulosic material, whether transparent, colored, opaque or translucent, when coated with an adhesive of the character herein described, made to be in elastic adhesive equilibrium, such film of material may be used and will expose its lustrous surface free from a warped or disfigured effect by reason of the fact that it carries the layer of adhesive.

Where transparency of the adhesive tape is not of major importance but where it is desired to provide a flat, unwarped exposed brilliant and lustrous surface, I have determined that an adhesive coating may be applied to the cellulosic films of the character previously enumerated and obtain a composite in which the adhesive is unified thereto and in elastic equilibrium with the film from a composition made as follows:

Example A

A rubber compound and tackiness augmenting agent in the form of a synthetic resin. Proportions suitable for ordinary temperate climates may comprise:

| | Pounds |
|---|---|
| Plasticized, first quality plantation rubber, such as clear crepe or smoked sheets | 10 |
| Cumaron gum or resin | 2 |
| Zinc oxide pigment | ½ |

The Cumaron gum or resin is preferably an artificial resinous material coming under the group name of Cumaron and Indene resins, which is the polymerization product of coal tar derivatives. The above ingredients are compounded on a rubber rolling mill to a plastic condition and then cut to desired body or consistency, using a rubber solvent such as benzol or a petroleum solvent, such as high test gasoline.

In lieu of a synthetic resin I may employ a low boiling point natural resin, e. g., Burgundy pitch or pine oil foots. Burgundy pitch is soluble in both alcohol and benzol.

Example B

| | Pounds |
|---|---|
| Plantation rubber | 2 |
| Mexican or wild rubber, high in natural resin content | 5 |
| Zinc oxide pigment | 1 |

The ingredients above enumerated are compounded on a rubber mixing roll and then cut to the desired consistency in a rubber solvent, based upon the necessary viscosity for spreading this material. Ordinarily, in both Examples A and B, the solvent is calculated by the number of pounds of solid compound in one gallon of solvent, such as, for instance 8 lbs. of solid or compounded material and 1 gallon of benzol, which is commonly referred to as an 8 pound cut. The variations in proportions of solvent added will depend upon the desired thickness of adhesive coating required in the residuum.

It will be understood that the examples above given are for purposes of getting the requisite adhesiveness in temperate climates. An increase in resinous material or wild rubber may be made for material to be used in colder climates and in warmer climates the resin component may be reduced.

The resinous component may also be varied in its characteristics in its reactions to solvents by choice of the resinous material. Thus, for purposes of removal of the adhesive from some body to which it may be applied, it may be made soluble to various organic solvents, either benzol, gasoline, acetone or alcohol. Thus, where it is desirable to make a surgeon's tape, which is soluble in alcohol, an alcohol soluble resin is added in the examples above cited. Such resin may be Burgundy pitch. This will permit alcohol to be used in removing a piece of adhesive tape from any surface, such as from the skin of a patient, by merely soaking the backing of the tape in alcohol. The rubber, in any event, merely acts as a vehicle for the resin and the character of the adhesive in its reaction to solvents will be dependent upon the character of the resin incorporated with the rubber.

The rubber resin compounds in their solvents may be spread upon the backing directly, utilizing a knife spreader to uniformly and equally distribute this material upon the backing. The solvent may thereafter be removed by evaporation, preferably recovering the solvent by some suitable recovery method, leaving the rubber mixture upon the gelatinized cellulosic backing material. The coating so applied is firmly adherent and unified to the backing material and provides a normally tacky and pressure sensitive adhesive coating of a unified character, without in any way curling or warping the transparent gelatinized cellulosic film. When using sheeted material comprising a combination of a regenerated cellulose film or sheet and a film of a cellulosic compound, the adhesives of the character above are particularly adherent and become unified directly with the backing so used.

Where it is desired to obtain a clear composite of backing material and adhesive, the adhesive preferred by me for this purpose may be made as follows:

*Example C*

| | Parts |
|---|---|
| Rubber (double break-down latex crepe) | 200 |
| Para Cumaron resin | 85 |
| Wood rosin | 10 |
| Liquid paraffin oil | 5 |

(All parts are by weight.)

As a variation from the above, where lack of transparency is not objectionable and the addition of a colored hue to the composite of backing and adhesive material desirable, the formula may be varied as follows:

*Example D*

| | Parts |
|---|---|
| Rubber (latex crepe) | 250 |
| Zinc oxide | 225 |
| Pine green light colored pigment | 25 |
| Wood rosin | 137 |
| Liquid paraffin oil | 30 |

This type of adhesive is normally tacky and pressure sensitive and has a greenish opacity. It will be understood that where a different color is desired to be imparted to the transparent film backing material, the pigmenting material may be correspondingly varied. Coloration in the adhesive may be used to neutralize or vary objectionable shades or colors in the transparent backing material.

If desirable, dyes may be used particularly to preserve the transparency and attractive sheen of the composite, or the color (pigment or dye) may be added to the backing material itself. In either method of addition, where dyes are desirable and particularly for a clear blue transparency, Indamine Blue is suggested as of value for this purpose: pigmenting may be accomplished by such material as Prussian Blue.

In the examples given above, paraffin oil has been included for purposes of plasticizing the rubber.

I have found that in order to obtain maximum transparency and the highest possible bond strength and firmness of the adhesive inter se, to avoid offsetting of the adhesive coating, that the paraffin oil may be omitted.

Such adhesive coating, particularly valuable for this purpose, is as follows:

*Formula E*

| | Parts |
|---|---|
| Rosin | 160 to 200 |
| Thin latex crepe rubber | 250 |
| Beta naphthol | 2.5 |

Approximately 3248 parts of benzol may be added to the above ingredients to provide a readily spreadable cement, and the ingredients may be incorporated in the benzol without the necessity for milling.

In the example given, beta naphthol has been specified and this is primarily used as an anti-oxidant. This material is desirable in the above formula, as well as in the other formulae given under A B and C, in that the adhesives are given longer life.

Other anti-oxidants are desirable and may be included wherever rubber is used in the adhesive. Such anti-oxidants which may be used are as follows:

(1) aldol-alpha-naphthylamine
(2) phenyl-beta-naphthylamine
(3) symmetrical-di-beta-naphthyl-para-diphenylene-diamine In the examples as above given, the preparations by weight and variation may be made in the primary materials, as well as the quantity of the ingredients. Thus, in the examples given under C, D, and E, latex crepe, the rubber component, may be varied by substitution in part or in whole by smoked sheet rubber. Though the synthetic resins, such as Cumaron resins above referred to are preferred, various blends of other synthetic resins may be utilized, in part or in whole. To a certain extent, the wood rosin may be substituted by various grades of gum rosin.

In making the adhesives, the rubber base and the resin base determine the tackiness exhibited by the finished product. This relationship, also coupled to a certain extent with the treatment given to the rubber, determines this factor.

In producing a clear adhesive, the relationship of plasticizer (above listed in the form of liquid paraffin oil) and resinous material may be considered as constituting the tack producing phase of the adhesive and the greater the quantity of the tack producing phase that is added to the rubber, the greater the tackiness exhibited in the rubber base adhesive.

In general, for every two parts of rubber base, by weight, one part by weight of the tack producing phase may be added. As indicated above, the resinous content may be varied to increase the tackiness. However, in order to provide a unified adhesive, satisfactory for purposes of unwinding of the tape from rolls, the resinous content must be retained within certain limits beyond which the adhesive is likely to offset at normal atmospheric temperatures. For practical purposes, from one to two parts of resin or the tack producing phase may be included to every one part by weight of rubber.

In the formulas above cited, double breakdown latex crepe rubber has been referred to and the treatment of this product alone, as well as the addition of the tack producing phase therewith, will control the characteristics of the adhesive layer. Thus, double break-down latex crepe, as contemplated by me above, results from milling latex crepe rubber for approximately fifteen minutes to plasticize the same, with or without heat, and after aging for twenty-four hours, is again plasticized in a mill. At this stage, the material is suitable for addition to, or with, the materials constituting the tack producing phase. This may be accomplished as follows:

Method A 200 parts of rubber (double break-down latex crepe from the rubber mill as above described) are placed in an internal mixer where the para Cumaron resin, wood rosin and paraffin oil are added gradually during the mixing operation to thoroughly incorporate the same into the rubber. No solvent need be used if the mixer is powerful enough to knead these resinous materials into the rubber. When the mixing has been thoroughly accomplished, a solvent such as benzol is introduced while the internal mixer is maintained in operation. This action is continued until complete solution results. The quantity of solvent added is in accordance with the means to be employed for spreading this material upon the backing material. It may, however, follow the preparations indicated above under Example B.

Method B 200 parts of rubber (preferably double break-down latex crepe as above made) are placed in a stirring equipment where paddles agitate the solvent and other ingredients into solution. When 200 parts of rubber have been placed into this mixer, the agitating member is started and a quantity of benzol added to dissolve the rubber. The resinous materials, in this particular example para Cumaron resin, wood rosin and the liquid paraffin oil, are dissolved in a separate mixer, using an additional quantity of benzol as a solvent. When these parts are uniformly distributed and in solution, the parts from each mixer are combined. The quantity of benzol is calculated in accordance with the method which may be used for spreading it upon the backing material and the proportions are chosen as in the example above recited, immediately following Examples A and B above, and/or as more particularly pointed out hereafter. The solvent is separated after coating or spreading of the adhesive upon the backing material.

In use, the adhesive as above described may be directly applied to the backing or sheets of transparent gelatinized cellulosic materials, previously enumerated, and forms a desirable product. Where a sheet is made of gelatinized cellulosic material which includes a waterproof coating, the adhesives as described may be directly applied, with very efficient results.

Where considerable unification is desired between the adhesive layer and the backing material, to assure proper anchorage of the adhesive layer with the backing material, thereby assuring satisfactory unwinding or separation when the composite is formed into rolls or stacks, it is preferred to first coat the sheet of gelatinized cellulosic material with a priming composition. Priming of one surface is particularly effective with sheets formed of regenerated cellulose. The priming operation consists of first coating the backing material before application of the adhesive materials previously described.

The priming composition as preferred by me is a solution of rubber-resin mixture in an organic solvent in which the solid materials may be varied from 15 to 50%, with 85 to 50% of the solvents used. Preferably, the solids constitute about 17% of the solution so prepared.

Primer type 1

A preferred composition comprises:

| | Parts |
|---|---|
| Rubber (latex crepe) | 2 |
| Resin (such as pine pitch or wood rosin) | 4 |
| A filler, such as whiting (optional) | 1 |

These two or three ingredients, as listed, constitute the solid components in the priming mixture above enumerated.

The priming composition so prepared is one which, upon deposition and volatilization of the solvent, will exhibit slow solubility upon treatment with the same solvent. In general, it is preferred, therefore, that the deposition product resulting from coating with the priming composition be one whose solid components retard the solvent action of the overlying material when coated thereon as a solution. That is, the solids which may be contained and are present in the primer composition are of such a nature that after deposition they are difficultly soluble in the solvent used for plasticizing and coating the adhesive layer. In the example above given, such properties may be imparted to the deposition product by utilizing rubber which has been partially vulcanized, this solution being effected by plasticizing in a mixing device such as an internal mixer in the presence of heat, sufficient to render the mass sticky. As an additional operation, a solvent retardant may be added and, to a certain extent, the filler indicated in Primer type 1 above serves this purpose. Though whiting is illustrated and preferred, those fillers which tend to exert an insolubilizing effect upon the rubber may also be used, such as zinc oxide.

Though it is indicated that high grade vulcanized rubber, plasticized to tackiness, may be utilized with some degree of success in the example above cited and identified as Primer type 1, it is preferred, particularly where transparency is desired, to use the combination of ingredients above identified, and to merely add during the mixing operation the requisite quantity of sulfur and accelerators. The quantity of these ingredients if any is merely sufficient to render the rubber component difficultly soluble in the solvent present in the solution of the adhesive composition, so made for spreading purposes, without reducing the quality of this priming coat to unify with the adhesive layer superimposed thereover.

*Primer No. 2*

Rubber, in the form commonly referred to as latex crepe, in the proportions above indicated, has added thereto sulfur and accelerators. These are vulcanized with heat after intimate admixture and while in the softened condition, are mechanically milled until a sticky mass, soluble in benzol or naphtha, is obtained. The amount of benzol or naphtha added is to obtain the requisite fluidity and these solvents may be added to the solid components in quantities of from 50 to 85%, as compared with the rubber and resin content.

Additional examples of primers which anchor the adhesive coating to regenerated cellulose such as "Cellophane" waterproofed or untreated (ordinary), are as follows:

*Primer No. 3*

|  | Parts |
|---|---|
| Selected tube reclaim rubber | 90 |
| Latex crepe rubber | 10 |
| Whiting | 40 |
| FF wood rosin | 140 |

*Primer No. 4*

|  | Parts |
|---|---|
| FF wood rosin | 2 |
| Rubber (latex crepe) | 1 |

*Primer No. 5*

|  | Parts |
|---|---|
| FF wood rosin | 2 |
| Rubber digested with alkali to remove non-rubber hydro-carbons—crude rubber or latex crepe may be thus digested with alkali for the purpose stated | 1 |

*Primer No. 6*

|  | Parts |
|---|---|
| Selected inner tube reclaimed rubber treated further to remove pigment | 90 |
| Latex crepe rubber | 10 |
| FF wood rosin, preferably Solros (a soluble resin whose soluble constituents and melting point are increased by a distillation process) | 140 |

This last primer is particularly transparent, and useful in connection with regenerated cellulose, such as "Cellophane," ordinary uncoated or that which is waterproofed by an additional film, a material which renders it non-hygroscopic.

The reclaim above referred to in the formula for making the primers is preferably made as follows:

Light colored inner tube stock may be utilized, though other forms of vulcanized rubber may be used. Where inner tube stock is used, it is chopped up on mill rolls, preferably of the type utilizing breaker members, simulating heavy gear teeth. Rolls of this character operate in pairs, the top one being free to move up and down, while the lower one is stationary. Relative rotation of these rolls serves to chop up the scrap. After the scrap is chopped and torn apart, it is fed to breakers, which pulverize it further, whereupon it is then passed over a screen and the fine particles separated out. The coarse particles are re-circulated through the breakers until they also go through the screen. The fine particles are then charged into horizontal digesters, where they are treated with caustic soda solution, the heating of the stock being carried out under a steam pressure of about 40 lbs., while being agitated. This treatment is carried out from 8 to 24 hours, to remove all fibres and free sulfur, and to plasticize the rubber. After digestion as above described, the stock is washed with water until practically free from caustic. The stock is then charged into a continuous-belt drying system, where it is dried at a rather low temperature. This stock is then ready for the mill room, where the first operation is to mass these small particles together on a large mill. After consolidation on the large mill, the rubber is then run through refiners, which comprises devices for grinding and crushing any of the hard particles of the stock. The product is then passed through a strainer in which the rubber is extruded through heavy mill screens into small rod-like forms, after which they are massed together into sheets or slabs.

In some cases, the procedure above described may be slightly varied, for example, when certain types of inner tube reclaim are desired, the pulverized scrap is heated in the presence of steam alone, without any caustic. It is thereupon, after being heated, sent directly to the millroom without any further treatment.

The primers above described under 1 and 2 may be further rendered resistant to the solvent action of the overlying adhesive to be applied in a subsequent step by the use of a priming composition which, upon separation of the solvent after application to the backing material, becomes vulcanized. Such material may be a material known on the market as "Vulcoloc." This material is to the best of my knowledge a reaction product of rubber and a sulphur bearing acid.

In its use "Vulcoloc" is applied to the backing material and the layer so applied is permitted to age, to result in aging and vulcanization of the rubber used in the primer, prior to the application of the solution of adhesive material. Application of an organic solution of the adhesive does not affect the coating of the "Vulcoloc" primer as applied.

Another material particularly suitable because of its inertness to solvents of unvulcanized rubber where this material constitutes the water insoluble rubber base adhesive coating, is an artificial or synthetic rubber known as "Duprene", an oil resisting rubber plastic made of acetylene and which is probably a polymerized diolefine compound.

In general, the primer layer is one which makes satisfactory bond with the regenerated cellulose backing material, or the gelatinized cellulosic material constituting such backing material, which may include a waterproofing layer of cellulosic compounds. Such material may be a layer of a synthetic resin, such as one of the group of polyhydric resins which make excellent union with gelatinized cellulosic materials and with rubber. In the event that it is desired to wholly eliminate the primer layer and waterproof the backing material of regenerated cellulose, where this is used, the waterproofing layer over the regenerated cellulose backing material is one which has affinity for the adhesive coating with which the adhesive coating makes better anchorage than would be the case if the regenerated cellulosic film alone were used. Such waterproofing materials may be a highly plasticized nitrocellulose or cellulose acetate, oxidized and gelatinized drying oils, synthetic resins, such as phenolic condensation resins, or those of water white characteristics, such as urea resins. Those ingredients are chosen, as above indicated, which will be difficultly soluble in the solvent used in the solution of the adhesive layer composition subsequently applied thereto, so as not to disrupt the waterproofing coating where the priming layer is used for this purpose, or prevent dissolving the dry priming coating, to thereby provide a weakened structure preventing proper unification between the adhesive coating and the backing material.

The method of application of the coating materials above described will, to a large extent, depend upon the character of the coating. The primer and adhesive coatings may be successively applied where these are used in solutions of volatile solvents, by an offset process from rollers uniformly coated with the primer composition or the adhesive composition. With the more viscous composition of either primer or adhesive, these layers may be coated upon the backing by a knife spreader. For the more plastic form of either composition and where unification is desired, calendering or frictioning of these materials may be resorted to, to apply either the priming coat or the adhesive coat, or both.

As an example of one method which may be followed in preparing the composite, the following procedure is recommended: a web of regenerated cellulose film of the desired thickness is carried through a set of vertically positioned squeeze rolls. The lower roll has transferred to it, or dips into the solution of the primer composition. A uniform layer of primer is applied at this point to the film or web of backing material. The web thus prepared travels from the squeeze rolls, to a duct for removing and drying off the solvents in the primer. The web then is directed to a contrivance for coating, at which point a doctor knife or coating knife is used to spread a film of the composition of adhesive material. This composition is directly applied over the primer and is preferably in the form previously described before deposition, under Examples A, B, C and D, and where a solvent is included by the adhesive composition, the composite as coated is either hung in festoons or travels through a drying duct, at which point sufficient time is allowed for complete removal of the solvent, and to form the deposition product to the desired consistency, due to the solid components present, for tackiness. If heat has been utilized to separate the solvent from the deposition product resulting in the adhesive, the composite thus formed may be cooled and brought to room temperatures, to render the product more convenient for stacking or winding into rolls. Where wound into rolls, the composite thus formed is then cut or converted into small rolls, suitable for trade requirements.

The adhesive composition as deposited upon the film heretofore described is one which is normally tacky and pressure sensitive. It is of particular utility in connection with the lustrous, highly polished backing material described in that the adhesive layer is in equilibrium with it and will not alter or warp its appearance. As indicated, the adhesive layer is unified in that it has great adhesion inter se and when applied as indicated, forms a unified product with the backing material. When wound into rolls or formed into stacks, the lustrous surface of the backing will not be modified, no offsetting will occur and ready separation is assured of the entire composite from its adjacent layer. Where the product is to be used in temperate climates and may encounter higher temperatures, it may be desirable to coat the back side of the backing material with a thin film of glycerine or lightly dust this surface with talc, flour or starch. In such event, a protective coating is applied which is not disintegrated by or which does not interfere with the adhesive action of the adhesive layer.

Though it is preferred to apply this protective layer to the composite opposite to the adhesive coating, this layer of material may be carried by the composite in a manner to assure its interpositioning between layers of adhesive material and backing material, when the composite is formed into stacks or rolls and it will be readily understood that this material will then act in the nature of slip sheeting when the article is thus formed. It will be understood, however, that under ordinary conditions, the composite of backing material and adhesive layer as hereinbefore described is a complete unified product and no further treatment need be made.

Though I have described the normally pressure sensitive adhesive coating as being directly applicable to transparent sheets of regenerated cellulose such as "Cellophane" or cellulosic compounds such as cellulose nitrate or cellulose acetate, it shoud be understood that where certain types of plasticizing agents are used to render the backing supple and flexible it may be desirable to coat the backing on one or both sides with thin films of impervious matter such as cellulose acetate or cellulose nitrate containing relatively small amounts of plasticizers. Such films not only serve to lock or seal the plasticizing agent into the backing but also provide the back of the sheet with a surface which is relatively inactive toward the pressure sensitive adhesive, thereby permitting the adhesive sheeting to be formed into rolls or stacks without danger of offsetting.

In the procedure heretofore described, I have indicated that it is preferred to have the adhesive coating as one which is normally tacky or pressure sensitive and that the adhesive layer is in adhesive equilibrium with the backing material described, to preserve the luster and sheen of the backing or its transparency, where this is desirable. It may be desirable, under certain conditions, to modify the adhesive layer to a condition where it is normally "dry" and is not normally pressure sensitive but may be energized to become adhesive by a moistening agent, to render it suitable for application as a seal, adhesive member, etc.

I have found that I may retain all the desirable characteristics of using a transparent backing material, or a highly polished and lustrous backing material, together with an adhesive layer and maintain the composite so formed in elastic adhesive equilibrium, to retain the highly polished, lustrous and/or transparent characteristics of the backing material, by a variation in the components of the adhesive layer, to obtain a product in which the adhesive layer is normally dry, and that I may further retain all these desirable characteristics, even though applying a moistening agent which serves to energize and render adhesive the normally dry coating or layer of adhesive material. Such a material as contemplated by me is one which is suitable for use in a dispenser type of applicator for adhesive tapes. In this type of article generally, a roll of the composite adhesive tape is fed in contact with a moistening agent, which exerts a solvent action upon the adhesive layer and thereby activates it and renders it sticky. In this condition, the tape or layer of material is applied for permanent adhesion as a seal or tie for a package, or for other purposes, such as packaging or covering arrangement. Upon setting or drying of the adhesive layer thus moistened, permanent adhesion is experienced, even when the adhesive is contacted and applied to highly polished lustrous surfaces, characteristic of gelatinized cellulosic materials, cellulosic films or, in fact, any other type of surface. The exposed back of this tape or layer carrying the adhesive is not affected by the moistening and drying action and will expose the backing material with substantially its original lustrous and highly polished surface, and with the transparency of the original material, where this type of composite is used. Where used for a seal, the joints are of exceedingly high strength and are waterproof in character. The tape so formed is particularly suitable in connection with films of regenerated cellulose, whether waterproof or not, and is capable of use where an ordinary glue base adhesive will otherwise alter and warp the regenerated cellulose film, where this is used.

As an example of the adhesive layer useful in making a composite of the character above described, the product may be made as follows:

Formula E (a)

| | Parts |
|---|---|
| Reclaimed rubber (selected tire tube reclaim) | 90 |
| Fresh rubber (latex crepe) | 10 |
| Zinc oxide | 86 |
| Water white rosin | 140 |

The rubber components are milled thoroughly with the zinc oxide, then dissolved in a suitable solvent which carried the rosin in solution and the entire mixture is then stirred to a smooth and homogeneous product. The quantity of solvent used in connection with the above is in accordance with the heretofore cited examples of adhesives and, in general, benzol may be used as a solvent. The solid components may constitute from 50–15% whereas the solvent may be from 50–85%. Preferably 17% solids to 83% solvent is used.

As a variation from the above, an adhesive coating of the character above referred to may be prepared from the following:

Formula F

| Solution A: | Pounds |
|---|---|
| Rubber (latex crepe) | 50 |
| Zinc oxide | 50 |
| Rosin | 250 |

| Solution B: | |
|---|---|
| Hide glue | 100 |
| Water | 200 |

Solution A is first prepared by dissolving the solid components comprising rubber and rosin in an organic solvent. The solvent is preferably benzol from 50–85% of the mixture as compared with 50–15% of the solids. Preferably, however, Solution A is one which constitutes 30% of solids and 70% of solvent.

Solution A may be made by milling the rubber with the zinc oxide and the rosin and then adding the organic solvent, comprising benzol. Preferably, however, the rubber is milled, has added to it gradually the zinc oxide component and during the milling operation of these two, the rosin component dissolved in the solvent is gradually added until the dissolution of the components is effected.

Solution B is prepared by swelling the hide glue in a minimum quantity of water over night and then after the hide glue has been completely softened, the full water component is added. The adhesive as contemplated by this formula is completely prepared by emulsifying the glue solution and the rubber solution so that the rubber solution is in the continuous phase and the glue solution in the dispersed phase.

In the above example, corn starch and dextrin may be substituted for the hide glue. Mixtures of glue and corn starch have also been found desirable.

As a still further variation of the above, I may prepare an adhesive suitable for my purposes in making a dry adhesive as follows:

Formula G

| | Pounds |
|---|---|
| Rubber (preferably thin latex crepe) | 262 |
| Zinc oxide | 262 |
| Wood rosin (preferably Solros) | 1300 |

The mixture as above indicated is made by milling the rubber and zinc components and then adding enough benzol to place the rubber in solution and thoroughly sustain the zinc oxide. When solution has been effected, the rosin, in benzol, is added and the entire batch mixed to effect a thorough distribution of the rosin and the rubber components. The rosin as chosen in the above example and known on the market as Solros is one which has been particularly treated to render it non-crystalline, and to reduce the quantity of its components which are insoluble in mineral oil. The material oxidizes more readily than higher grades of wood rosin or gum rosin.

In the examples cited above under Formulae E, F and G, the quantity of the rosin as compared with the rubber will be determined by the reduction of tackiness which may be desired to be imparted to the rubber and the requisite speed of setting and hardening of the adhesive surface after moistening and application of the composite carrying it. The larger quantities of the resin added in proportion to the rubber, the slower will be the action of setting after volatilization of the solvent while the reduction of the resin will tend to retain tackiness in the adhesive coat. I may add from 1.4 to 6 times the quantity of resinous material, particularly those resins described, to rubber and retain the desirable characteristics of the adhesive coat in the final sheet.

Though I have described as a particular relationship of resinous material to rubber as coming within the range of 1.4 to 6 parts of resinous material to one part of rubber, a particularly desirable form of solvent activatable adhesive coating may be obtained from the following:

Formula Ga

| | Parts |
|---|---|
| W. W. rosin (water white) | 3 |
| Flexo resin | 3.2 |
| Zinc oxide | 2.0 |
| Latex crepe | 2.0 |
| Oleum spirits | 12 |

The flexo resin above referred to is an oxidized and polymerized terpene, polymerization being effected concurrently with partial air oxidation.

In the formula above given, the zinc oxide may, wherever specified, be omitted.

Though the ingredients above given are preferred, the ingredients may be varied within wide limits.

It would be desirable to observe the relationship of the rosin and the flexo resin mentioned so as to retain the rosin from 2 to 5 parts and the flexo resin from 3 to 6 parts.

In general, the latitude allowable is preferably such as to have the relationship of these ingredients in connection with the latex crepe and oleum spirits, such as to maintain a relationship of 2 parts of rosin and 3 parts of flexo resin, to 5 parts of rosin and 6 parts of flexo resin. The total rosin-resin content should preferably be kept above 5 parts and below 11 parts, as the limit below the lower figure tends to give a product which is too tacky, and the higher figure, a product which is too brittle.

In the formula given, the zinc oxide content may be varied from one half to four parts, though as previously stated, this ingredient may be omitted.

In the above formula, oleum spirits have been referred to. This is a hydro-carbon solvent of indefinite boiling point, its boiling range falling between its initial boiling point of 306 degrees F. and its end point of 424 degrees F.

Though I have included in the formulas illustrated an ingredient which is not soluble in the mixture of rubber and resin, such as zinc oxide in the Formulae E and G, and zinc oxide and an aqueous ingredient in Formula F, these are cited merely by way of example. In general, they are included where the tape is submitted to a rubbing action during the moistening operation and some degree of body is desired to be imparted to the film forming the adhesive layer and also where a proper moistening of the film is desired without displacement due to such solvent action as the moistening agent may exert upon the adhesive film.

Thus, in the Examples Ea and G, zinc oxide, and in Example F, zinc oxide and dispersed glue act, to a certain extent, to properly control the moistening action upon the adhesive layer by the moistening agent that may be used, serving in the nature of a film control filler.

The adhesive as prepared in solution in the requisite solvent, such as benzol, is applied to a backing material, as by the method aforesaid, such as by passing the film of backing material through a set of squeeze rolls, one of which dips into the solution of the adhesive material to transfer the adhesive to the backing material, after which the solvent is removed by passing the web of material through suitable drying chambers or ducts. Though the application of the adhesive to the backing material may be preceded by a priming coat and though this is found desirable in applying a normally tacky and pressure sensitive adhesive coating, this is not found necessary in applying the aforementioned adhesive, which is intended to leave a dry coating as the adhesion of the adhesive compositions, including the high quantity of rosin or resinous material, is so intense as not to require this preliminary treatment. Especially is this true when applying the formulas of adhesives under Examples E, F and G to a fibrous type of backing material. This type of adhesive is particularly useful for this purpose and instead of utilizing the highly lustrous, glossy and/or transparent films of gelatinized cellulosic material, the adhesive thus described, suitable for forming a dry surface, is admirably suitable for application to paper backing material, such as kraft paper. In this direction it is preferred that such paper known as sixty pound kraft paper be utilized. I may also use "unified" backing material prepared in acordance with my applications, S. N. 182,893, and S. N. 281,104 now Patent No. 1,760,820. Where the paper has been "unified" by an impregnation with a glue base material, a priming coat may be desirable and the primers described in my last mentioned patent may be used.

The backing materials, including the adhesive coating as above described, may then upon drying of the adhesive, be directly formed into rolls or stacked. Where a fast setting adhesive coating is found desirable so that a lower quantity of resinous material is used in proportion to the rubber component, there may be a tendency, especially in the warmer climates, for the adhesive coating to have a tacky reaction, particularly at the time when the web of material is wound into rolls. At this point, the unwinding properties may be improved by dusting talc or starch upon the composite formed by the paper and adhesive, so that a separating coat of starch or talc lies between the paper and adhesive surface when webs of this composite are formed into rolls. Preferably this may be accomplished by dusting with a minute quantity of starch or talc the dry coating of adhesive.

While I have above described the preferred range and specific percentage of solids to solvents for the primer composition, it will be understood that the solids may constitute 100% or 0% and that where 100% solids are used the method of application described previously in the specification may be used. Where no solids are used the solvent is applied just immediately preceding the application of the adhesive coat. While still wet the adhesive coat is applied to assure greater anchorage of the adhesive coating to the backing by its solvent action on the coating and backing material.

Where pyroxylin is used for the waterproof layer b, it may be plasticized by a quantity of resinous materials in proportion of about 67% to 50% of resinous material to about 33% to 50% of nitrocellulose material. Under such conditions the solvent necessary to render the waterproof coat active for adhesion may be the ordinary known solvents for nitrocellulose without modification. In such event no other coating of adhesive material need be applied. As a more particular formula for the coating composition, the following is an illustration, viz:

| | Pounds |
|---|---|
| Nitrocellulose, such as "½ second cotton" | 9 |
| Xylol | 16 |
| "Cellosolve," which is ethylene glycol ($C_4H_{10}O_2$) | 10 |
| Resin such as Rezyl 12, which is a condensation product of castor oil and phthalic anhydride | 12 |
| Dammar cut, which is a solution in the proportion of 40% dammar resin and 60% benzol | 16 |

The above composition may form the adhesive coating of a normally dry character upon volatilization of the solvents and may be activated to adhesiveness by the normal solvents for nitrocellulose.

A composite as made in accordance with the above may be maintained upon a dispenser of the kind now generally used in connection with glue bond adhesive tape and the adhesive surface may be activated by organic volatile solvents, such as gasoline or benzol. These solvents, though inflammable, may be readily utilized if care is exercised to prevent the volatile portions of these solvents from coming in direct contact with highly heated objects or open flames. Otherwise, non-inflammable chlorinated hydrocarbons, such as carbon tetrachloride or ethylene dichloride may be employed. When moistened by organic solvents, particularly those above enumerated, the adhesive film becomes rapidly activated and may be immediately applied to a large number of surfaces and will set with greater rapidity than that experienced with adhesive tape which is moistened with water and utilizes a glue base adhesive layer. When the coating as above described is applied to the films of gelatinized cellulosic materials, the lustre and brilliancy of the film will not be impaired and where this backing material is transparent, no warping will occur which will tend to defeat the purpose of using this type of material, as the adhesive layer, as in the case previously enumerated, is in elastic equilibrium with said surface to which it is applied or with which it comes in contact. Any packaging material using this seal will stand crumbling or sharp bending without becoming disengaged at the point so sealed.

Where the film of backing material comprises composites of gelatinized cellulosic materials, such as regenerated cellulose coated with cellulosic compounds, such as nitrocellulose or those other waterproofing ingredients previously enumerated as used in connection with regenerated cellulosic films, the dispenser type of adhesive enumerated under formulae E, Ea, F and G may be directly applied. Greater tenacity may be experienced with regenerated cellulose surfaces particularly those which may have been softened by the addition of glycerine, by the addition of small percentages of the primers heretofore described to the adhesive enumerated under formulae E, Ea, F and G or by the application of a primer layer of the character hereinbefore described.

When the dispenser type of adhesive is applied to paper backing material, moistening of the adhesive with an organic solvent before application for a seal or similar purposes, will not weaken the paper even though the moistening agent may be excessively applied and the full strength of the backing material is retained. Where used upon transparent backing material, such as gelatinized cellulosic films, the adhesive after setting will tenaciously affix itself to the highly polished surfaces and will thereby form an effective waterproof and water tight seal.

Coated upon paper backing, a more positive adhesion is obtained in its application to various uses. A greater rapidity in setting lends itself towards a more rapid fabrication in such processes as may involve the use of adhesive tapes, such as in the fabrication of cartons, paper boxes or similar products. Similarly, paper coated with these adhesives may be made up into corrugated boards with great rapidity and provide a resulting product of great strength in that it resists the moistening action resulting in storing the products contained in such packages under conditions which would ordinarily disintegrate and weaken glue base adhesive products. Thus, dressed meats and dairy products may be stored in cartons utilizing this type of adhesive tape, and be stored in refrigerated rooms for long periods of time without disintegration. The adhesive will equally adhere to asphalt coated paper or wax coated fabrics or paper treated in this fashion, to be resistant to oils and fats and obtain secure adhesion and proper anchorage. The composite adhesive and backing material is valuable in providing a product which is absolutely impervious to high humidities and permits direct application of water without disintegration. The composites of backing material and adhesive will not become disintegrated or become weakened or inactive by prolonged storage under moist or adverse storage conditions, detrimental to present day glue base adhesive tapes.

Though I have described as one phase of my invention, the preparation of adhesive tapes or sheets made upon cellulosic backings in which the coating comprising the adhesive layer is a pressure sensitive material or organic solvent-activatable material, the particular characteristics of which are their water insolubility, such materials may also include adhesive coatings which have substantially the same characteristics in relation to the backing material, but which are of the water soluble or water activatable type.

Thus it is contemplated by me to provide cellulosic materials or cellulosic compounds as hereinbefore enumerated, such as regenerated cellulose, with or without waterproofing coatings, of the character previously enumerated, or cellulosic compounds, such as nitro-cellulose, cellulose acetate, cellulose ethers, or mixed ethers and esters of cellulose, and to some extent, highly transparent or translucent papers, such as glassine paper with adhesive coatings which are water soluble or water activatable, giving a fabric in all respects comparable to two classes of materials previously described and referred to as pressure sensitive adhesive materials, or solvent activatable adhesive materials.

In relation to backing materials of transparent characteristics or semi-transparent characteristics, I have been able to produce adhesive sheets comparable to a certain degree with that previously enumerated with water insoluble coatings, as to lustre, transparency, by providing the backing materials previously enumerated with water soluble coatings.

For the production of adhesive material which is normally pressure sensitive and which is water soluble, the following may be given as an example:

*Formula H*

| | Parts |
|---|---|
| #1 glue | 280 |
| Water | 280 |
| Glycerine | 840 |
| White sugar | 210 |
| Beta naphthol | 2.8 |

As another embodiment illustrative of a pressure sensitive adhesive, the following may be given:

*Formula I*

| | Pounds |
|---|---|
| Glue (dry) | 250 |
| Water | 250 |
| Glycerine | 750 |
| Granulated sugar, or 75% of the dry glue weight | 187½ |

The composition may be made by swelling the glue with a quantity of the specified water, assisted by warming and thereafter, the granulated sugar and glycerine are added with the remaining quantity of water. The glycerine is used for its flexibility augmenting and water-retaining properties and the sugar is used not only because of its water-retaining properties, but also because it produces a desirable modification of the glue-glycerine-water gel structure in imparting to it increased toughness and adhesiveness.

In general, it is preferred to use organic compositions as modifying agents for glue base adhesives; and such modifying agents may be included to impart various properties to the final adhesive composition such as flexibility, tackiness, moisture retention, slow solubility in water, and, in some cases it is desirable to add inert matter as a filler. The following is a list of organic modifying agents which may be used in glue base adhesive compounds:

(1) Glycerine (crude or refined).
(2) Honey (crude or refined).
(3) Glucose.
(4) Sulphonated castor oil.
(5) Water soluble vegetable gums such as tragacanth or gum arabic.
(6) Venice turpentine.
(7) Small percentages of drying or non-drying oil.
(8) Shellac.
(9) Paraffin or other waxes.

In the claim where I use the term "organic glue modifying agent" I mean to include thereby such agents as above listed which in certain cases serve as substitutes for the components listed in the formulae.

In the present form of my adhesive, where I use sugar and glycerine as the glue modifying agents, the adhesive is prepared as follows: the quantity of glue is swelled in water, the action being facilitated by warming. Separately, I fuse the sugar and glycerine content by mixing the same at a temperature of about 250 degrees F. The temperature is preferably retained below 300 degrees F. Temperatures in excess of 300 degrees F. and up to 350 degrees F. will produce an entirely different result. The water-glue mixture and the sugar-glycerine mixture are then combined, preferably at the lower stated temperature. The material so prepared may be spread upon any fabric webbing to obtain a non-drying adhesive coating. This non-drying adhesive coating has been found to be particularly suitable by reason of its water soluble character. A sugar-glycerine modified glue adhesive has been found to have particularly desirable characteristics of water carrying capacity, preventing ageing or drying of the adhesive. The glue or gelatine has had imparted thereto increased body and toughness.

In the preparation of the adhesive above described, the highest quality hide glue has been found to be most practical for use in the production of an adhesive best suited for a non-drying tape. Many kinds and grades of glue may be used and still produce the desirable results, also some of the water soluble vegetable gums such as tragacanth, acacia, and gum arabic may be used. Inferior glues or hide and bone glues have certain valuable characteristics, among which is the possibility of introducing solid materials without increasing the setting properties or jell strength of the adhesive. The working properties of the adhesive may thus be controlled by the proper selection of the solid material in accordance with the varying climatic and atmospheric conditions or to the more particular tastes of the user to modify the aggressiveness of the adhesive to render the same more rapid in its action or retard the same. These solid materials may be magnesium carbonate, lead oxide, whiting, zinc oxide and what may be termed paint pigments.

As an additional example of a pressure sensitive adhesive coating using a mixture of gelatinous material, the following may be given:

Example J

| | |
|---|---|
| Irish moss | 8 to 15 parts, preferably 10 parts |
| Gelatine glue | 0 to 10 parts, preferably 8 parts |
| Glycerine | 45 to 75 parts, preferably 60 parts |
| Water | 125 to 275 parts, preferably 125 parts |

This solution as above described may be used for coating purposes, and after coating in the percentages above given is aerated or heated to drive off substantial portions of the water so that in the final film, the glycerine and water content will be approximately equal to each other.

A still further example of a pressure sensitive adhesive of the water-soluble character, may be as follows:

Example K

| | Pounds |
|---|---|
| Hide glue | 100 |
| Water | 137 |
| Glycerine | 400 |
| Calcium chloride | 37 |
| Beta naphthol in alcohol (1% solution), about | 2 |

As a still further example of a pressure sensitive adhesive, the following may be used:

Example L

| | Parts |
|---|---|
| #2 glue | 50 |
| Aqua resin | 50 |
| Water | 75 |

The aqua resin above referred to is in the nature of a water soluble resin made by the condensation of polyhydric compounds with acids, particularly by the condensation of glycols with acids. Preferably a compound made to result in a glycol bori borate, is used. Somewhat similar, though not as desirable results may be obtained by using glyceryl bori borate, instead of the glycol bori borate resin, previously mentioned. The aqua resin mentioned is used as a plasticizer and flexibility agent, as well as, to some extent, as a moisture retaining or hygroscopic material, to retain the film flexible, and where used in sufficient quantities as above enumerated as a backing augmenting agent.

In the examples given, though glue has been specified, other gelatinous materials, such as gelatine, casein, gum arabic, and other water soluble gums and albumens may be used though glue is preferred by me.

As further examples of materials serving as tackiness augmenting and moisture retaining agents, the following may be enumerated:

(1) Glycerine.
(2) Triethanolamine.
(3) Glycol.
(4) Diethylene glycol.
(5) Carbitol (diethylene glycol monoethyl ether).

In the examples above given under Formulae H to L, the adhesive may be directly coated upon the transparent or semi-transparent cellulosic materials, such as glassine paper, preferably transparent sheetings of the regenerated cellulosic type, such as "Cellophane", to provide water soluble, normally pressure sensitive adhesive coatings upon these backing materials. Where the backing material comprises regenerated cellulose, which has been flexibilized by the treatment with glycerine, the water soluble, pressure sensitive adhesive coatings may be directly applied thereto and fairly good anchorage may be obtained, particularly with the water soluble, pressure sensitive adhesive coatings given under Formula H and Formula L, and to the further extent that with these last named ingredients and for portions in particular, the Formulae H and L provide exceedingly transparent composites corresponding substantially in all respects to that obtained with the water insoluble, transparent adhesive coatings, retaining the adhesive coating in "elastic equilibrium" with the backing material.

Where I have found that the water soluble adhesive coatings given under Formulae H and L are particularly desirable in connection with transparent cellulosic backing materials, the use of the impermeable transparent sheeting as supports for and in connection with the adhesives made under Formulae I to K, inclusive, provide desirable products to the extent that the impermeability of the backing material will serve to maintain the water soluble adhesive coatings flexible and substantially without variation and deterioration for prolonged periods of storage when they are formed into rolls or stacks.

Where the backing material is of a waterproofed type, such as regenerated cellulose coated with a thin film of nitrated cellulose or cellulose acetate or these cellulose esters with additional modifying and plasticizing agents; or the backing material comprises substantially entirely cellulosic compounds, such as nitrated cellulose or cellulose acetate, it may be desirable to facilitate the anchorage of the water soluble adhesive coating by interposing a priming solution before applying the water soluble adhesive coating.

The priming coat preferred by me is of the emulsion type and may be made from the following:

*Primer type 7*

Casein _____ 3 to 8 pounds, preferably 5 pounds
Water _____ 9 to 40 pounds, preferably 30 pounds
Concentrated amonium
  hydroxide _____ 1 to 8 pounds, preferably 3 pounds
Rubber latex (preferably 60%
  concentration) _____ 3 to 25 pounds, preferably 16 pounds The ageing qualities of the above primer may be increased by adding maleic acid, preferably in the proportions of 1 pound of maleic acid to the preferred total ingredients above enumerated.

The characteristic features of the primer above enumerated are that it is compatible with the backing material where it is regenerated cellulose, such as "Cellophane", flexibilized with glycerine, or such cellulosic material including the cellulosic compounds previously enumerated, coated with waterproofing materials, and is also compatible with any of the previously mentioned water insoluble, pressure sensitive adhesive coatings and the water soluble adhesive coatings.

The emulsion primer just described is also particularly useful in connection with the preparation of semi-transparent or translucent tapes in which paper, treated to render the same semi-translucent, is utilized and which transparency is augmented by treatment with a resinous material or varnish to enhance the transparent characteristics. The two phase or emulsion type primer just described facilitates the application of any of the normally pressure sensitive adhesive coatings, whether of the water soluble or water insoluble type.

In the primer of the emulsion type or double phase type, previously enumerated, I have referred to the use of casein in connection with rubber latex. The casein is more or less water soluble, especially in the presence of the ammonium hydroxide and not only facilitates anchorage to glycerine treated "Cellophane", but is also compatible with the water soluble type of adhesive coating when the priming coat is finally dried. This water soluble material, as included in the primer, may be supplemented by, or substituted by glue, isinglass or gelatine, and other similar water soluble materials, which not only facilitate the dispersion of the latex but also include the feature of being compatible with water soluble materials. It will further be noted that though in the preferred form of the primer, where casein is used, it is preferred to use ammonium hydroxide in order to facilitate the solution of the casein, the quantity of ammonium hydroxide may be reduced where other water soluble materials are used and merely sufficient ammonium hydroxide is used to prevent untimely separation of the solids of the rubber latex.

The rubber included in the emulsion type of primer is for purposes of having some material compatible with the water insoluble coating and while I have specified in my preferred form of primer, the inclusion of a dispersion of rubber later, artificial resins, particularly those which will give a clear and colorless or water-white residuum may also be used, and some of the glyptal or urea resins may be substituted for the dispersion of latex to obtain some degree of desirable results.

In general, my emulsion type primer may be characterized as a double phase primer to the extent that it includes emulsified ingredients of both water soluble, and water insoluble characteristics, in dispersed form.

It will be understood that in the application of the primer to the backing material, drying is effected after coating, before the adhesive coating is applied.

In the examples given above for the preparation of a water soluble, pressure sensitive adhesive coating, the pressure sensitive adhesive qualities are dependent more or less upon the quantity of water retained by the plasticizing ingredients, after coating the adhesive composition upon the backing, and aeration, to reduce the water content to about 3 to 10% of the original content used in the preparation of the compound, thus retaining the adhesive in normally tacky or pressure sensitive condition. Where it is desired to have a substantially, normally dry adhesive coating activated by water, the quantity of hygroscopic material is reduced. In the formula above given, under L, where aqua resin is specified, a reduction of the aqua resin by about 10% will be sufficient to provide an adhesive coating which is normally dry, but is activatable by water. In the other formulae given for the preparation of the water soluble, normally pressure sensitive adhesive coating, a reduction of the hygroscopic material in percentages from 10 to 50% of the original amount given will be sufficient to provide a normally dry adhesive coating, readily responsive, however, to water to render the same active.

Where I have specified the provision of a water soluble, pressure sensitive adhesive coating in connection with regenerated cellulosic backing materials or sheeted material or cellulosic compounds, such as nitrocellulose or cellulose acetate, or the regenerated cellulose provided with waterproofing films to reduce the hygroscopicity of regenerated cellulose, these sheets may be characterized as being substantially impermeable and are particularly desirable with water soluble, normally tacky, pressure sensitive adhesive coatings, especially where these materials include hygroscopic agents or hygroscopic flexibilizing agents, in that when these materials are formed into rolls or stacks, the characteristics of the adhesive coating, whether pressure sensitive or normally dry and flexible, will be maintained without substantial variation, even though stored for long periods of time.

I may further insure against variation in the properties of the adhesive coating by providing rolls of this material with a sealing sheet covering the sides and edge of the roll. Sheets of waterproofed cellulose, cellulose acetate or cellulose nitrate may be used, though tin foil and similar metallic foils may also be used.

In the examples enumerated, normally dry solvent activatable adhesive coatings have been specified, that is, that which may be activated by the application of water or an organic solvent, it is to be observed that such coatings which are normally dry may be activated to adhesiveness by the application of heat and the activation to adhesiveness may be made more rapid by combined action of the solvents and heat.

Where it is desirable to provide an adhesive sheet or tape of the solvent activated type having quick tack and rapid setting characteristics, I have found the following adhesive composition to be of particular value:

Example M

| | Parts |
|---|---|
| Vinylite A resin (dissolved in 10 parts ethylene glycol) | 10 |
| Bakelite XRA 20 resin (dissolved in 6.6 parts di-acetone alcohol) | 10 |
| ½ second nitrocellulose solution | 2 |
| Dibutyl phthalate | 1 |

These ingredients are thoroughly mixed and applied to the backing materials, the solvent being subsequently removed by evaporation, thus forming a normally dry coating which upon wetting with a suitable solvent rapidly becomes adhesive and forms a quick setting bond of unusual strength.

I have found that adhesive tape made in accordance with Example M is of particular utility in sealing protective caps of "Cellophane" or other transparent material over the tops of milk bottles and other similar food containers.

To illustrate the new and novel article as herein provided, and the method of using the same, resulting in new and novel methods of packaging, reference is made to the accompanying drawings, forming a part hereof, in which:

Figure 1 is a perspective view of a package made in accordance with my invention;

Figure 2 is a section taken on the line 2—2 of Figure 1;

Figure 3 is a fragmentary perspective view of another embodiment of my invention;

Figure 4 is a fragmentary perspective view of another embodiment of my invention;

Figure 5 is a diagrammatic illustration of a method of packaging and sealing, utilizing the article heretofore described;

Figure 6 is a plan view of a sheet useful therefor;

Figure 7 is a perspective view of a roll of adhesive tape made in accordance with my invention;

Figure 8 is a sectional view thereof;

Figure 9 represents another embodiment of my invention.

The method of wrapping and packaging, as contemplated by me, in one of its embodiments, resides in providing a transparent wrapping material 10, made of transparent films or sheets, preferably comprising gelatinized cellulosic material, such as regenerated cellulose, a form of which product is known on the market as "Cellophane". In the preferred form as utilized by me, this gelatinized cellulosic film has coated on both sides thereof transparent coatings of waterproofing material, such as plasticized pyroxylin. In the illustration shown, a sheet of this material 10 is wrapped about the article, which may be the goods themselves, such as in displaying packages of nuts, dates, candy, meats or the like, or articles already packaged in printed material, such as candy, cigars and cigarettes. This wrapping material is formed about the article, the edges being folded over or superimposed, as shown at 11. Over these superimposed edges, I may affix a layer of tape 12. The tape 12 may comprise any of the composite adhesive tapes made by me and as heretofore described. Preferably this comprises a film or sheet of gelatinized cellulosic material carrying a layer of adhesive, which is in elastic adhesive equilibrium with the tape forming the backing material. My invention contemplates sealing the overlapping edges 11 to render the contents of the package airproof and waterproof, to avoid losses of the moisture of the contents of the package and to prevent atmospheric moisture or humidity from altering the contents of the package. For this purpose, I interpose between the transparent tape 12, the film of adhesive material which is in elastic equilibrium with the backing material, and set the tape over the superimposed edges of the package. This will in no way alter the display of the highly polished and lustrous finish of the package, and the transparency of the composite, particularly where this type of adhesive layer is utilized, will be maintained.

The tape 12 as contemplated by me in the aforementioned illustration, may carry a water soluble in or waterproof, water insoluble, normally tacky and pressure sensitive adhesive of the character indicated by me and made by the aforementioned process. The adhesive coating, however, may well be one which is normally dry, of the compositions herein described and is activated to adhesiveness just before application or contacting by an organic volatile solvent or water, depending upon the nature of the adhesive coating. Where the coating serves in the nature of a waterproof sealing coat for the transparent gelatinized cellulosic material, such as regenerated cellulose, the organic volatile solvent moistening ingredient which is chosen is one which will energize this coating and render it adhesive. While it is contemplated by me, where a highly polished and lustrous packaging material, comprising regenerated cellulose, with waterproof coatings comprising gelatinized cellulosic compounds, such as pyroxylin or cellulose acetate, as being the character of the material which may be used, it is preferred by me to include with the backing material, a waterproof adhesive coating through which the moistening agent quickly strikes and which sets rapidly, of the character hereinbefore described and comprising a rubber and resin mixture as the base.

Where a sheet of tape or packaging material of transparent material, comprising a film or layer of regenerated cellulose coated with a cellulosic compound to waterproof the regenerated cellulose and comprising plasticized pyroxylin is used either as the packaging material or the tape, the process for sealing the package may include moistening the plasticized layer of the cellulosic compound with a solvent for this layer, such as a mixture of the acetone and amyl acetate, which temporarily dissolves the plasticized pyroxylin coating. However, as the proportioning of the solvents used to activate to adhesiveness the waterproofing film, in drying may cause blushing and thereby altering of the appearance of the package as to its lustrous, highly polished and transparent characteristics, it is preferred by me to utilize either upon the packaging material itself or upon the backing material of the character herein described, the adhesive materials indicated herein under Formulae A, B, C, D, E, F and G, preferably as in the examples heretofore indicated, by a modification, where it is desirable, by the application of a primer coat preceding the adhesive coat.

In the illustration, where I utilize a tape which is clear and transparent, and the composite carried thereby is equally clear, transparent, and in elastic equilibrium with the superimposed edges of the packaging material and the tape, the general appearance of the entire article will be the same and at the same time the entire contents of the package is sealed against ingress of atmospheric moisture and water, as well as serving to seal the contents of the package from losses due to evaporation from within.

In Figure 3 I have illustrated the application of the sealing member as contemplated by me to a package 15, comprising paper having printed matter shown thereon, as at 16. Edges of the packaging material comprising this printed paper are shown to overlap at 17. Over the superimposed edges I may apply a sealing member 18. This sealing member or tape comprises a transparent backing material including an adhesive coating of the character hereinbefore described, which may be one which is normally tacky or pressure sensitive or one which may be activated by moistening to an adhesive condition. A seal as thus provided serves to properly fasten and bind the overlapping edges of the packaging wrapper. This is effectively done by reason of the adhesive coating chosen and where a backing material is utilized which is transparent, the printed matter appearing on the wrapper will be clearly visible therethrough. Thus, by my invention, paper wrappers having printed matter may be employed and this wrapper may be sealed effectively by a transparent adhesive tape serving to effectively bind the edges of the wrapper utilized, without marring or detracting from the ornamental surface or the identifying printing matter constituting the wrapper.

In the embodiment illustrated in Figure 4, a package 19 is shown, including an interior wrapper 20. This wrapper may have printing matter of a colored motif and in the example shown, this is shaded for the color green. Where this is used and it is desired to further wrap this interior wrapper 20 with a highly polished, lustrous and transparent wrapping material of the character whose base may be regenerated cellulose, the overlapping edges as shown at 21 are provided with a sealing layer of adhesive 22. This adhesive layer is also preferably of the character which retains the layers of highly polished, lustrous and/or transparent wrapping material in elastic adhesive equilibrium, to maintain this condition. It may, however, be a sealing medium of waterproof characteristics, which has the same color index or color motif appearing on the interior wrapper 20. By using an adhesive of the character herein generally referred to in Example D, this may be readily accomplished and provide a package in which the highly polished, lustrous wrapping material has its edges united in elastic adhesive equilibrium, to retain this desirable characteristic, and with a color index or hue of the same character as the interior or decorative wrapper.

In Figure 5 I have diagrammatically illustrated a method of packaging or sealing. This involves the uniting of the layers 23 and 24. These layers may constitute mutual contacting adjacent edges of a packaging wrapper and/or an overlying piece of tape over the overlapping edges of a wrapper. Either one or both of the layers 23 and 24 may constitute a composite indicated in the figures by the legends (a), (b), (c), in which the layer (a) may be the film of gelatinized cellulosic material, such as regenerated cellulose or "Cellophane"; layer (c) may be the film or layer of waterproof material or plasticized pyroxylin or cellulosic compound; layer (b) may be a film of waterproof material, such as plastized pyroxylin or a cellulosic compound, with or without a layer of waterproof adhesive. Where waterproof adhesive is included by the layer (b), this may be one of the adhesives hereinbefore described which will join the layers 23 and 24, particularly where this is a highly lustrous, brilliant and/or transparent sheet, into contact having elastic adhesive equilibrium, to retain and preserve it the same.

In practice, the layers 23 and 24 are united, preferably passing the layer 24 through a set of guiding rollers 25 and 26, the lower one of which is a moistening roll and is in contact with the applicator or transfer roll 27, moistened by the wick 28. In its continued movement, the layer 24 passes beneath the pressure roll 29, at which point the layer is pressed into engagement with the layer 23, lying upon the flattened portion 30. This latter portion may be the table or the contents of the package itself. It is understood, however, that where I use a normally pressure sensitive adhesive coating as the layer (b), the moistening operation may be omitted entirely. The character of the moistening agent is dependent upon the nature of the coating and water may be used for a water soluble coating or an organic solvent or mixtures thereof, for a water insoluble coating.

For the water insoluble adhesive coating, the moistening agent included by the wick is one which is an organic volatile solvent or a combination of solvents which will serve to adhesively activate the surface (b). Where the surface (b) is plasticized pyroxylin or a similar cellulosic compound, the moistening agent is chosen to be one which will have a dissolving effect upon this ingredient. Where the layer (b) constitutes a waterproof film as part of the tape or the packaging material, such as a film of the normally dry rubber-resin composition, gasoline or benzol may serve as the moistening agents, and where non-inflammability is desirable, chlorinated hydrocarbons, such as ethylene dichloride and carbon tetra-chloride may be used.

The process essentially resides in dissolution of the surfaces, such as those identified as (b), and pressing them together during the time when they have been activated to adhesiveness by reason of the moistening action.

Where the layer (b) includes a waterproof adhesive which is normally dry, particularly that constituting a large proportion of resinous material, the layers 23 and 24 are united after passing beneath the pressure roller 29 and will set quickly.

In Figure 6 I have disclosed another embodiment of my invention in the form of a prepared packaging material, in which $a$ is the backing material, $b$ are spaced longitudinal strips of adhesive, and $b'$ transverse strips of adhesive. This material may be formed in sheets or in rolls.

In Figures 7 and 8 there is shown a roll of tape made in accordance with my invention, in which the backing material may comprise an impermeable fabric 31, carrying a coating of adhesive material 32. Where the backing material 31 is impermeable, characteristic of regenerated cellulose which has been provided with a sealing coat of non-hygroscopic material or a film of plasticized nitro-cellulose or cellulose-acetate, the adhesive coating 32 may be either the water insoluble or the water soluble adhesive coating and where the latter is normally pressure sensitive or activatable by moisture, the keeping qualities of this pressure sensitive surface of its flexibility where the latter is water activatable, will be enhanced by the association of the impermeable backing with this character of adhesive, as briefly heretofore emphasized. And while certain forms of the water soluble, pressure sensitive adhesive coatings or water activatable adhesive coatings heretofore described are preferred by me, in that particularly in relation to transparent or semi-transparent backing materials, such adhesive coatings are in elastic adhesive equilibrium with the backing, with other of the adhesive coatings of the water soluble, normally pressure sensitive character, which include substantial percentages of hygroscopic agents, the combination of these other adhesives with the impermeable backings mentioned will have the additional desirable characteristics resulting from the enhanced keeping qualities of the package. To further avoid any changes in the predetermined sensitive characteristics of the tape when formed into rolls, a sheet of similar fabric 33 may be applied to the ends of the roll 34 and held in position by an adhesive coating 35 of substantially the same characteristics as that used at 32. This may, however, be a water insoluble, normally pressure sensitive adhesive coating, though the water soluble pressure sensitive adhesive coating is preferred by me.

In the embodiment of my invention shown in Figure 9, I provide the cap 36 of transparent cellulosic material, having its edges formed and creased to fit the bottle neck as shown at 37, and the solvent activated, quick action, adhesive tape, 38 encircling the creased portion of the cap and thus forming a tight waterproof seal which prevents the ingress of dust, dirt or other matter which might contaminate the contents of the bottle.

In general, it will be observed that I accomplish a sealing of the adjacent layers of edges for packaging by a dissolving action of the fabric itself, constituting the packaging material and with a highly polished and lustrous, and/or transparent film of the character described, this is accomplished without altering these desirable properties.

Where, in addition to the waterproofing layers for such sheets as are made from regenerated cellulose, the waterproofing surfaces include the adhesive compositions herein specified, activation or dissolution of these surfaces result in adhesion of contacting surfaces with a speed of operation heretofore unattained. The adhesive action is accomplished with a preservation of the desirable characteristics of the packaging material and even to the point of augmenting these desirable qualities by imparting a pigmenting action, carrying forward the general color motif of the package to which it is applied, in addition to other desirable properties previously indicated. The packaging materials have their utility extended in that their airproof and moistureproof qualities are augmented by providing seals which are as efficient in these properties as are the packaging materials themselves or the parts which the seals unite.

More specific phases of the package are claimed in my divisional application, Serial No. 191,262, filed February 18, 1938.

This application is a continuation-in-part of my prior filed application Serial No. 534,386.

I claim:

1. In a packaging device including a wrapping sheet comprising a transparent gelatinized cellulosic material, a seal for said wrapping material, including a water insoluble adhesive, said adhesive maintaining said sealed portions in elastic adhesive equilibrium and maintaining the wrapping material in the transparent gelatinized condition aforesaid.

2. In a packaging device including a wrapper made of a sheet of highly lustrous, waterproof gelatinized cellulosic material, the overlapping joints whereof being sealed, said seal comprising a water insoluble adhesive material, maintaining said overlapping joints in elastic adhesive equilibrium and maintaining the wrapping material in the lustrous condition aforesaid.

3. In a packaging device, a wrapper comprising transparent, waterproof regenerated cellulose, the adjacent edges of said wrapper being sealed, said seal comprising an adhesive tape including a backing material of waterproof regenerated cellulose, the tape being united to said adjacent edges of said wrapping material by an adhesive maintaining said wrapping material and tape in elastic adhesive equilibrium and maintaining the tape and wrapping material in the transparent condition aforesaid 4. In a packaging device, a wrapper comprising a folded sheet of transparent gelatinized cellulosic material, said wrapping material being formed over an interiorly disposed printed or otherwise ornamented layer, the overlapping folded portions of said wrapper of transparent material being sealed and united by a waterproof adhesive material, maintaining the edges of said wrapper in elastic adhesive equilibrium, and of compatible color index to said interiorly printed or ornamented wrapper.

5. The method of packaging which includes folding a sheet of transparent gelatinized cellulosic material, including a waterproofing film over an article to be wrapped, edges of said sheet being folded into adjacent contacting relation to form a joint, and sealing the joint so formed by a dissolving action upon the waterproofing material only, without altering the transparent characteristics of the wrapping material at the sealed joint thus formed by the employment of a non-solvent for the cellulosic material.

6. The method of packaging which includes folding a sheet of transparent gelatinized cellulosic material, including a waterproofing film, over an article to be wrapped, edges of said sheet being folded into adjacent contacting relation to form a joint, and sealing the joint so formed by a moistening agent activating only the waterproof coating into adhesiveness, said moistening agent being inactive to alter the transparent characteristics of the sheet, and then setting the adjacent portions of said sheet so rendered adhesive, to thereby seal the package.

7. In a packaging device including a wrapping sheet comprising a transparent gelatinized cellulosic material, a seal for said wrapping material, including a water insoluble, normally tacky and pressure sensitive adhesive, said adhesive maintaining said sealed portions in elastic adhesive equilibrium and maintaining the wrapping material in the transparent gelatinized condition aforesaid.

8. In a packaging device including a wrapper made of a sheet of highly lustrous, waterproof gelatinized cellulosic material, the overlapping joints whereof being sealed, said seal comprising a water insoluble, normally tacky and pressure sensitive adhesive material, maintaining said overlapping joints in elastic adhesive equilibrium and maintaining the wrapping material in the lustrous condition aforesaid.

9. In a packaging device, a wrapper comprising a folded sheet of transparent gelatinized cellulosic material, said wrapping material being formed over an interiorly disposed printed or otherwise ornamented layer, the overlapping folded portions of said wrapper of transparent material being sealed and united by a waterproof normally tacky and pressure sensitive adhesive material, maintaining the edges of said wrapper in elastic adhesive equilibrium, and of compatible color index to said interiorly printed or ornamented wrapper.

10. In the method of packaging which comprises folding a sheet of transparent and waterproofed gelatinized cellulosic material into wrapping position the steps which include sealing together only by pressure contact the overlapping joints of said wrapping material with a water insoluble, normally tacky and pressure sensitive adhesive material.

11. In a packaging device, a wrapper comprising a transparent and lustrous sheet of regenerated cellulose, the adjacent edges of said wrapper being sealed by means of an adhesive tape and remaining in elastic adhesive equilibrium therewith, said adhesive tape comprising a transparent backing material and a transparent normally tacky and pressure sensitive adhesive of water soluble characteristics.

12. In a packaging device, a wrapper comprising a transparent and lustrous sheet of regenerated cellulose, the adjacent edges of said wrapper being sealed by means of an adhesive tape and remaining in elastic adhesive equilibrium therewith, said adhesive tape comprising a transparent backing material and a normally dry water soluble adhesive, said adhesive being actuated to adhesiveness by moistening with water.

13. A package formed of sheet material made from the class of materials including a gelatinized cellulose base taken from the group consisting of regenerated cellulose, cellulose esters or ethers, such as cellulose nitrate, cellulose acetate, ethyl cellulose, or combinations thereof, said sheet being formed into enveloping position and having folded ends and a longitudinal seam and provided with a permanently tacky sealing strip secured over said longitudinal seam and folded ends.

RICHARD GURLEY DREW.